United States Patent Office 3,400,089
Patented Sept. 3, 1968

3,400,089
PROCESS FOR PREPARING BRIGHT DRYING POLYETHYLENE DISPERSIONS USING A POTASSIUM SALT AS THE EMULSIFYING AGENT
Herbert Bestian, Frankfurt am Main, and Helmut Korbanka, Hofheim, Taunus, Germany, assignors to Farbwerke Hoechst Aktiengesellschaft vormals Meister Lucius & Bruning, Frankfurt am Main, Germany, a corporation of Germany
No Drawing. Filed May 10, 1965, Ser. No. 454,679
Claims priority, application Germany, May 16, 1964, F 42,905
6 Claims. (Cl. 260—23)

ABSTRACT OF THE DISCLOSURE

A process has been provided for the production of bright drying polyethylene dispersions. These dispersions are produced when ethylene is polymerized at a temperature of 110° to 150° C. at a pressure of 400 to 700 atmospheres, when using potassium salts of fatty acids having more than 9 carbon atoms in the carboxylic acid group as an anionic emulsifier, and when using as a catalyst a water soluble persulfate. The specified emulsifier system produces aqueous polyethylene dispersions having a solids content of at least 35% by weight when the polymerization is carried out under conditions specified above and in a one stage process.

---

The present invention relates to a process for preparing bright drying polyethylene dispersion.

It is known to transform ethylene in the presence of water and an emulsifier in an alkaline medium into polyethylene dispersions. Of the large number of known processes for preparing polyethylene dispersions directly by the polymerization of ethylene in the aqueous phase, only one leads to the formation of products which can be used in the industry and be applied for various purposes, in particular for the preparation of floor polishes. These dispersions meet most of the requirements made in practice. It is required inter alia that the dispersions remain stable even when they are stored for a prolonged period; that they are free from coagulum; that they are not susceptible to mechanical and thermal influences and that they are compatible with the other components generally used in the preparation of floor polishes. In addition, it is required that after drying on a substratum they yield bright films which are resistant to black heel marking, to dirt pick up, to water and to scuffing and can well be removed. For reasons of economy the polyethylene dispersions should have a solids content of at least 35% by weight, preferably of at least 40% by weight.

Belgian Patents 616,650 and 621,386 disclose a two-stage process according to which ethylene is polymerized in the aqueous phase in the presence of an anionic emulsifier and, preferably, tertiary butanol by means of water-soluble persulphates serving as catalysts at a temperature within the range of about 70° to about 100° C. under a pressure which preferably is within the range of about 175 to 350 kg./cm.². The dispersions obtained by these processes have a solids content of at most about 3% by weight. By evaporation, the solids content of the dispersions may be increased to about 40% by weight. If tertiary butanol has been added it is also removed by the evaporation.

By the necessity of concentrating the dispersions after the polymerization the aforesaid process is made complicated and expensive. Since the dispersions foam very much the thickening of the latex has to be carried out in special apparatus, for example, in rotary evaporators or falling film evaporators, whereby the process is complicated.

The present invention provides a simple, one-stage process for preparing polyethylene dispersions by polymerizing ethylene in the aqueous phase in the presence of an anionic emulsifier and a water-soluble persulphate serving as a catalyst, whereby concentrated dispersions having a solids content of at least 35% by weight, preferably of at least 40% by weight, are obtained immediately. According to the invention, at least 5% by weight, preferably 7 to 12% by weight, calculated on the aqueous phase, of the potassium salt of a saturated fatty acid containing more than 9 carbon atoms in the molecule is used as an emulsifier and the polymerization is carried out at a temperature above the crystallization temperature of the polyethylene that forms, namely at a temperature within the range of 110° to 150° C. and under a pressure of at least 400 atmospheres.

The process according to the invention offers the great advantage that a highly concentrated polyethylene dispersion which has all the properties required for its use in practice is obtained in one reaction stage.

It is particularly advantageous that the process according to the invention can be carried out in batches. It may, however, also be carried out continuously. The dispersions obtained by the batchwise operation have better gloss-producing properties. The preparation of polyethylene dispersions is advantageously brought about in an autoclave provided with an effective stirrer which must enable the substances contained in the autoclave to be mixed well even if they have a high degree of viscosity. The water used for the preparation of the reaction mixture must be free from harmful ions, in particular calcium and magnesium ions. There may be used, for example, distilled water or water which has been freed from salt by means of ion exchangers. Impurities adhering to the ethylene and the other reactants and additives, which would disturb the polymerization have to be eliminated, too.

The polymerization of the ethylene is initiated by means of water-soluble persulphates, for example, potassium persulphate, sodium persulphate and ammonium persulphate, which serve as free radical polymerization initiators. Less favorable results are obtained with the use of organic peroxides, azo compounds or mixtures of these substances with persulphates. The water-soluble persulphates are used in quantities within the range of 0.001% by weight to 0.5% by weight, calculated on the water used. Owing to the small quantities of catalyst used the proportion of sulphur contained in the dispersions is very low. During the polymerization there may also be added chain transfer agents, for example, hydrogen, hydrocarbons, halogen compounds and alcohols with the exception of tertiary butanol.

As emulsifiers, potassium salts of saturated fatty acids are used in the process according to the invention. In principle, the corresponding sodium salts may also be used but they have the drawback that they lead to the formation of dispersions having a pronounced tendency to gelatinize. The dispersions prepared with the use of sodium soaps solidify at a temperature above +10° C., in some cases at a temperature above +20° C., whereupon pastes form which at a temperature above the setting point again get liquid and form dispersions of low viscosity. When a potassium soap is used as the emulsifier this effect which impairs the utility of the dispersions in practice does not occur. The dispersion which form when potassium soaps are used are thinly liquid even at a temperature below 0° C. At temperatures below −3° C. the whole dispersion freezes whereby it may be destroyed.

The potassium soaps of saturated fatty acids which according to the present invention are used as emulsifiers advantageously contain more than 9 carbon atoms. It is particularly advantageous to use as emulsifiers potassium salts of fatty acids which contain 12 to 18 carbon atoms or mixtures of such salts. Dispersions having particularly fine particles are obtained when potassium laurate is used as the emulsifier. Potassium salts of fatty acids containing less than 10 carbon atoms have no emplsifying effect. Soaps of fatty acids containing more than 18 carbon atoms may also be used. However, the longer the carbon chain the less the soaps are soluble in water. The salts of the last-mentioned fatty acids also have the disadvantage that they lead to the formation of dispersions of coarser particles even if they are used in the same concentration as the other salts. When the proportion of the emulsifier is increased to more than 12% the properties of the polyethylene dispersions are impaired.

The fatty acids from which the potassium salts are derived should be saturated. When unsaturated acids are used only low degrees of conversion are attained and consequently the dispersions have a low solids content. In order to prepare the emulsifier solutions the potassium soaps may be dissolved in water. But it is also possible and in some cases even advantageous to prepare the soaps during the preparation of the emulsifier solutions from the components fatty acid and potassium hydroxide. It is very important to carry out the polymerization in the aqueous phase at an alkaline pH, perferably at a pH within the range of 8 to 12.5, in particular 9 to 12. The alkali used for the neutralization of the fatty acid may be used in an excess. The excess is preferably within the range of 10 to 30% by weight. If the alkali is not present in an excess polyethylene dispersions form which have a high latex viscosity, a low stability and a pronounced tendency to cream.

The alkaline pH may be adjusted partly or completely by a salt having an alkaline reaction, for example, tertiary potassium or sodium phosphate. According to the invention the emplsifiers are used in a concentration of at least 5% by weight, preferably within the range of 7 to 12% by weight, calculated on the water used. When the reaction is carried through until the resulting polyethylene dispersion has a solids content of at least 35% by weight, preferably of at least 40% by weight, the proportion of emulsifier is above 2.5% by weight, preferably within the range of 4 to 7% by weight, calculated on the weight of the dispersion. When the proportion of emulsifier is smaller than 5% by weight, calculated on the aqueous phase, and the reaction is carried through until the solids content is at least 35% by weight unstable dispersions are obtained which have a pronounced tendency to cream and have no bright drying properties. The polymerization of the ethylene is carried out at a temperature above the crystallization temperature of the polyethylene that forms, namely at a temperature within the range of 110° to 150° C., the highest solids contents being obtained when operating at a temperature within the range of 120° to 140° C. The dependency of the solids contents on the polymerization temperature will be demonstrated by the following Table 1 to which the examples given below refer.

TABLE 1

| Ex. No. | Polymerization temperature (° C.) | Polymerization pressure in atmospheres | Solids content in percent by weight | Crystallization temperature (° C.) |
| --- | --- | --- | --- | --- |
| 1 | [1] 80 | 500 | 17.2 | 106 |
| 2 | [1] 100 | 500 | 27 | 104 |
| 3 | [2] 126 | 500 | 42 | 97 |
| 4 | [2] 147 | 500 | 35 | 93 |
| 5 | [1] 165 | 500 | 21.4 | 88 |

[1] For comparison purposes.
[2] According to the invention.

It can be seen from Table 1 that during the reaction the solids contents and, consequently, the degrees of conversion attain their highest values at a temperature above the crystallization temperature of the polyethylene that forms.

The crystallization temperature is measured as follows: A thermoelectric couple is introduced into the melt of the polyethylene precipitated from the dispersion. The molten specimen is allowed to cool slowly in a thermostat, the progress of the cooling as a function of time being continuously recorded by a temperature recording instrument. The turning point of the curve representing the cooling indicates the crystallization temperature, that is the temperature at which the crystallization chiefly takes place.

According to the invention the polymerization is carried out under a pressure of at least 400 atmospheres. The application of higher pressures under otherwise the same conditions leads to higher solids contents, as can be seen from Table 2. Simultaneously the molecular weights are increased when higher pressures are used. In the preparation of polyethylene dispersions for floor polishes the polymerization is preferably carried out under a pressure within the range of 400 to 700 atmospheres.

TABLE 2

| Example No. | Polymerization temperature (° C.) | Polymerization pressure in atmospheres | Solids content in percent by weight |
| --- | --- | --- | --- |
| 6 | 130 | [1] 100 | 10 |
| 7 | 130 | [1] 300 | 22 |
| 8 | 130 | [2] 500 | 40 |
| 9 | 130 | [2] 700 | 48 |

[1] For comparison purposes.
[2] According to the invention.

The polyethylene dispersions obtained by the process according to the invention are transparent to white liquids. When their solids content is less than 45% by weight they have a low latex viscosity and at temperatures above the freezing point they are stable for an unlimited period and insensitive to mechanical stress.

The polyethylene dispersions according to the invention dry on a substratum, for example, a floor covering, while producing a high gloss. The high gloss-producing property is evidently due to the small particle size which is below 100 m$\mu$. The narrow particle size distribution must also be mentioned. More than 90% of the particles have a size within the range of 5 to 60 m$\mu$.

The surface tensions of the dispersions according to the invention are within the range of 35 to 60 dynes/cm. The dispersions do not tend to form stable foams while being processed. The solids content of the polyethylene dispersions is at least 35% by weight. When they contain more than 45% by weight of solid substances the latex viscosity rises to an increased extent. When the reaction is continued until the solids content is above 50% by weight pastelike mixtures are obtained. The latex viscosity of dispersions of 40% strength is below 100 cs. and chiefly within the range of 10 to 50 cs., measured at 25° C. in an Ubbelohde capillary viscosimeter. The latext density of dispersions of 40% strength, at 20° C., is within the range of 0.96 to 0.98 gram/cc.

The properties of the polyethylene can be determined by precipitating the polyethylene from the dispersion and examining it. The precipitation can advantageously be carried out by means of a mixture of aqueous hydrochloric acid and methanol. The moleculer weight of the precipitated polyethylene may be different according to the polymerization conditions. Polyethylene in a wax dispersion has a molecular weight below 20,000. There may also be prepared dispersions of polyethylene having the nature of a plastic material and a molecular weight of more than 100,000. Under the conditions of polymerization which according to the invention are preferred products having a molecular weight within the range of 10,000 to 30,000 are obtained. Dispersions of this kind can be used particularly well for the preparation of bright drying floor polishes.

The polyethylene precipitated from the dispersion prepared according to the invention can be melted into a colourless mass after having been washed intensely with water and methanol. In contradistinction thereto, the colour of polyethylenes which have been prepared by emulsion polymerization at a temperature below 100° C. and consequently below the crystallization temperature changes more or less strongly when the polyethylenes are melted.

The polyethylene precipitated from the polyethylene dispersions according to the invention has good hardness properties. Its penetration as determined according to DIN Specification No. 51,579 is below 5. Under the conditions of polymerization which according to the invention are preferred it is even below $2 \times 10^{-1}$. Owing to its high degree of hardness the dried dispersions are very resistant to mechanical influences.

The precipitated polyethylene contains only traces of sulphur and only up to 2% by weight, in most cases less than 1% by weight of oxygen. The presence of this oxygen which is chemically bound in the polyethylene is due to a chain transfer reaction with the emulsifier in which small quantities of the soaps used as emulsifier are incorporated with the molecule. Owing to their high gloss-producing properties, their resistance to black heel marking, to water, dirt pick up and scuffing the polyethylene dispersions obtainable by the process according to the invention can well be used for the preparation of bright drying dispersions for floor polishes.

The following examples serve to illusrtate the invention but they are not intended to limit it thereto.

EXAMPLES 1 TO 9

(Cf. Tables 1 and 2)

In each of these experiments an autoclave having a capacity of 2 litres and equipped with a lifting magnetic stirrer was rinsed with ethylene until the last traces of air had been removed, and a solution of 45 grams of lauric acid, 15 grams of potassium hydroxide and 6.5 grams of tertiary potassium phosphate in 450 grams of distilled water was introduced into the autoclave by means of a high-pressure pump. The autoclave was then heated to the temperatures indicated in Tables 1 and 2 for each of the experiments. The pressure in the autoclave was raised to the values indicated in Tables 1 and 2 by introducing ethylene under pressure while stirring vigorously. The polymerization was initiated by introducing a solution of 0.5 gram of potassium persulphate in 150 grams of distilled water into the autoclave by means of a high-pressure pump. Because of the strongly exothermic reaction the autoclave was cooled and the desired polymerization temperature was maintained by the rate at which the catalyst solution was introduced into the reaction space. The progress of the polymerization was perceptible by the drop of pressure. The pressure was continuously restored by the inrtoduction of further quantities of ethylene under pressure. When the whole quantity of the catalyst solution had been introduced into the autoclave the reaction was terminated. The batch was kept for another half hour at the polymerization temperature. The contents of the autoclave were withdrawn via an ascending tube. The quantity of polyethylene dispersion obtained was within the range of 650 grams to 1000 grams, depending on the solids content.

EXAMPLE 10

A solution of 225 grams of lauric acid, 75 grams of potassium hydroxide and 32.5 grams of tertiary potassium phosphate in 2250 grams of distilled water was introduced into an autoclave having a capacity of 10 litres and provided with a lifting magnetic stirrer. The autoclave was rinsed with ethylene until the air was removed and then heated to 130° C. At that temperature ethylene was introduced under a pressure of 500 atmospheres. Then the stirrer was set in action in order to emulsify the ethylene. A solution of 2.0 grams of potassium persulphate in 750 grams of distilled water was introduced into the autoclave by means of a high-pressure pump in the course of 145 minutes. After the beginning of the polymerization a temperature of 130° C. and a pressure of 500 atmospheres were maintained. After the polymerization was terminated the reaction mixture was kept for another 15 minutes at 130° C. The contents of the autoclave were relieved from pressure by being introduced into a cyclone separator. 4700 grams of a polyethylene dispersion having a solids content of 41.2% by weight, a latex viscosity of 16 cs. (measured at 25° C. in an Ubbelohde capillary viscosimeter), a latex density of 0.975 gram/cc. (20° C.) and a surface tension of 40.2 dynes/cm. at 20° C. were obtained.

The polyethylene was precipitated by adding to the dispersion a mixture of dilute aqueous hydrochloric acid and methanol. The polyethylene was washed several times with hot water and with methanol and heated to 180° C. under a pressure of 0.1 mm. of mercury. The cooled melt was free from volatile substances. It had a crystallization temperature of 96° C., a density of 0.918 gram/cc. at 20° C., a reduced viscosity of 1.33 dl./gram (determined in this and all the following experiments at 85° C. as a solution of 2% of in xylene) and a penetrometer number (determined according to DIN Specification No. 51,579) of $1.5 \times 10^{-1}$ mm.

EXAMPLE 11

A solution of 43.8 grams of capric acid, 16.9 grams of potassium hydroxide and 6.5 grams of tertiary potassium phosphate in 450 grams of water was introduced into an autoclave having a capacity of 2 litres. The polymerization was carried out at a temperature of 125° C. under a pressure of 500 atmospheres of ethylene. A solution of 0.35 gram of potassium sulphate in 150 grams of water was used as the catalyst. After one hour of polymerization a polyethylene dispersion having a latex viscosity of 12.3 cs. (at 25° C.), a latex density of 0.980 gram/cc. (20° C.) and a surface tension of 50 dynes/cm. (20° C.) was obtained. The precipitated polyethylene had a density of 0.918 gram/cc. (20° C.), a reduced viscosity of 1.095 dl./gram and a penetrometer number of $0.8 \times 10^{-1}$ mm.

EXAMPLE 12

This experiment was carried out in the manner described in Example 11. But a solution of 45.8 grams of myristic acid, 13.7 grams of potassium hydroxide and 6.5 grams of tertiary potassium phosphate in 450 grams of distilled water was placed into the apparatus. The reaction was carried out under a pressure of 500 atmospheres and at a temperature within the range of 120° to 130° C. The catalyst solution used was a solution of 0.30 gram of ammonium persulphate in 150 grams of distilled water. 930 grams of a polyethylene dispersion of 36% strength which had a latex viscosity of 9.2 cs. (at 25° C.) and a surface tension of 53.8 dynes/cm. (20° C.) were obtained. The polyethylene precipitated from the dispersion had a density of 0.918 gram/cc. (20° C.), a reduced viscosity of 0.51 dl./gram and a penetrometer number of $1.4 \times 10^{-1}$ mm.

EXAMPLE 13

This experiment was carried out in the manner described in Example 11. A solution of 47.2 grams of stearic acid, 11.7 grams of potassium hydroxide and 6.5 grams of tertiary potassium phosphate in 450 grams of distilled water was used for the emulsification. The polymerization was carried out under a pressure of 500 atmospheres at 125° C. in the presence of a catalyst solution formed of 0.35 gram of potassium persulphate and 150 grams of water. After 90 minutes of polymerization 920 grams of a polyethylene dispersion of 44% strength were obtained which had a latex viscosity of 33 cs. (at 25° C.), a latex density of 0.965 gram/cc. (20° C.) and a surface tension of 52.4 dynes/cm. (20° C.). The precipitated polyethylene had a density of 0.918 gram/cc. (20° C.), a reduced viscosity of 0.914 dl./gram and a penetrometer number of $1.2 \times 10^{-1}$ mm. The dispersion was stable at temperatures down to −3° C.

EXAMPLE 14

An autoclave having a reaction capacity of 125 litres and provided with a stirrer was charged per hour at its lower end with a continuous stream of 36 kg. of ethylene, 10 kg. of emulsifier solution and 3 kg. of catalyst solution. The emulsifier solution contained 8825 grams of distilled water, 795 grams of lauric acid, 265 grams of potassium hydroxide and 195 grams of tertiary potassium phosphate. A solution of 25 g. of potassium persulphate in 2975 g. of water served as the catalyst solution. In the autoclave a pressure of 500 atmospheres and a temperature of 125° C. were maintained. From the upper part of the autoclave a stream of unreacted ethylene and 20 kg. of polyethylene dispersion was continuously withdrawn per hour and relieved from pressure by being introduced into a centrifugal separator. The unreacted ethylene was compressed again and returned to the process while the polyethylene dispersion was separated and withdrawn.

The degree of conversion of the ethylene into polyethylene in the reaction vessel amounted to 24.5% by weight. The polyethylene dispersion had a solids content of 44% by weight. It contained 10.5% by weight, calculated on the solids content, of emulsifier. It had a latex viscosity of 13 cs., a surface tension of 37.5 dynes/cm. and a latex density of 0.965 g./cm. It was stable at temperatures down to −5° C. and dried on a substratum in a thin layer, while producing a high gloss.

The polyethylene precipitated from the dispersion had a density of 0.914 g./cc., a penetrometer number of $3 \times 10^{-1}$ mm. and a reduced viscosity of 0.808 dl./g.

What we claim is:

1. A process for the manufacture of an aqueous dispersion of polyethylene having a content of at least 35 percent by weight, calculated on the aqueous medium, of solid particles, by polymerizing ethylene in an aqueous medium in the presence of an anionic emulsifying agent and 0.001 to 0.5% by weight calculated on the amount of water used of a water-soluble persulphate as catalyst, which comprises adding as emulsifying agent 5 to 12 percent by weight, calculated on the aqueous medium, of a potassium salt of a saturated fatty acid having at least 9 carbon atoms in its molecule and polymerizing at a temperature in the range of 110 to 150° C. and under a pressure of at least 400 atmospheres in an alkaline medium, said dispersion having bright-drying properties.

2. The process of claim 1 wherein 7 to 12 percent by weight, calculated on the aqueous medium, of the potassium salt of a saturated fatty acid having at least 9 carbon atoms in its molecule is used as emulsifying agent.

3. The process of claim 1 wherein 5 to 12 percent by weight, calculated on the aqueous medium, of a potassium salt of a saturated fatty acid having 12 to 18 carbon atoms in its molecule is used as emulsifying agent.

4. The process of claim 1, wherein the polymerization is carried out at a pressure of 400 to 700 atmospheres.

5. The process of claim 1 wherein the polymerization is carried out at a pH-value of 8 to 12.5.

6. The process of claim 1, wherein the polymerization is carried out at a pH-value of 9 to 12.

References Cited

UNITED STATES PATENTS

| 3,352,807 | 11/1967 | Helin et al. | 260—29.6 |
| 3,244,652 | 4/1966 | Helin et al. | 260—23 |
| 3,296,170 | 1/1967 | Burkhart et al. | 260—29.6 |

DONALD E. CZAJA, *Primary Examiner.*

R. A. WHITE, *Assistant Examiner.*